US007919549B2

(12) United States Patent
Nakamura et al.

(10) Patent No.: US 7,919,549 B2
(45) Date of Patent: *Apr. 5, 2011

(54) BIODEGRADABLE RESIN COMPOSITION AND MOLDED ARTICLE PRODUCED FROM THE SAME

(75) Inventors: Nobuo Nakamura, Settsu (JP); Taizo Aoyama, Settsu (JP); Yoshihiko Hashimoto, Settsu (JP); Noriyuki Suzuki, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/920,164

(22) PCT Filed: May 8, 2006

(86) PCT No.: PCT/JP2006/309257
§ 371 (c)(1),
(2), (4) Date: Jun. 10, 2008

(87) PCT Pub. No.: WO2006/121011
PCT Pub. Date: Nov. 16, 2006

(65) Prior Publication Data
US 2009/0111921 A1    Apr. 30, 2009

(30) Foreign Application Priority Data

May 9, 2005   (JP) ................. 2005-136696
May 13, 2005  (JP) ................. 2005-141965

(51) Int. Cl.
*C08K 5/21* (2006.01)
(52) U.S. Cl. ........................................ 524/211
(58) Field of Classification Search ............ 524/211
See application file for complete search history.

(56) References Cited

U.S. PATENT DOCUMENTS 5,859,119 A * 1/1999 Hoefflin .............. 524/494
5,981,257 A * 11/1999 Fukui et al. ........... 435/232
6,645,622 B2 * 11/2003 Yamane ............... 428/364

FOREIGN PATENT DOCUMENTS

| JP | 6-41376 A | 2/1994 |
| JP | 6-299077 A | 10/1994 |
| JP | 10-101919 A | 4/1998 |
| JP | 10-158369 A | 6/1998 |
| JP | 11-5849 A | 1/1999 |
| JP | 2002-155207 A | 5/2002 |
| JP | 2003-128901 A | 5/2003 |
| JP | 2004-051659 * | 2/2004 |
| JP | 2004-161802 * | 6/2004 |
| JP | 2004-269720 A | 9/2004 |
| JP | 2004-285258 A | 10/2004 |
| JP | 2005-23165 A | 1/2005 |
| JP | 2005-232230 A | 9/2005 |
| JP | 2006-45487 A | 2/2006 |
| JP | 2006-137853 A | 6/2006 |
| WO | WO 2005/085352 A1 | 9/2005 |

OTHER PUBLICATIONS

Machine translation of JP 2004-051659.*
Machine translation of JP 06-299077.*
Machine translation of JP 11-005849.*
Machine translation of JP 2004-161802. Jun. 2004.*

* cited by examiner

*Primary Examiner* — Milton I Cano
*Assistant Examiner* — John Uselding
(74) *Attorney, Agent, or Firm* — Sughrue Mion, PLLC

(57) ABSTRACT

Disclosed is a resin composition excellent in molding processability which comprises a plant-derived biodegradable plastic produced by actively fixing carbon dioxide present in the earth. A resin composition excellent in molding processability, comprising (A) a biodegradable (3-hydroxyalkanoate) copolymer having a recurring unit represented by the formula (1): [—CHR—$CH_2$—CO—O—] (wherein R represents an alkyl group represented by the formula $C_nH_{2n+1}$ and n is an integer of 1 to 15) and 0.1 to 100 parts by weight, based on 100 parts by weight of (A) the biodegradable (3-hydroxyalkanoate) copolymer, of (B) an acrylic modifier having a weight average molecular weight (Mw) of 500,000 to 10,000,000.

9 Claims, No Drawings

BIODEGRADABLE RESIN COMPOSITION AND MOLDED ARTICLE PRODUCED FROM THE SAME

CROSS REFERENCE TO RELATED APPLICATIONS

This application is a National Stage of International Application No. PCT/JP2006/309257 filed on May 8, 2006, claiming priorities based on Japanese Patent Application Nos. 2005-136696 filed on May 9, 2005 and 2005-141965 filed on May 13, 2005, the contents of all of which are incorporated herein by reference in their entirety.

TECHNICAL FIELD

The present invention relates to a composition comprising a biodegradable polymer of plant origin which is obtained by positively fixing carbon dioxide around the earth and is expected for prevention of global warming, and a molded article produced from the same. More particularly, the present invention relates to a composition which comprises an acrylic additive and a (3-hydroxyalkanoate) copolymer that is a biodegradable aliphatic polyester-based resin, which is excellent in molding processability and the like, and to a molded article.

BACKGROUND ART

Conventionally, plastics have characteristics such as processability and usability, whereas, they have been thrown away after use owing to their difficulty in recycling, and to hygienic point of view. However, as the use and disposal of the plastics increase, problems associated with their disposal by landfilling or incineration have drawn attention, and they may be responsible for great burden on the global environment such as deficiency of garbage landfill site, influences on ecological system by remaining nondegradable plastics in the environment, generation of detrimental gas in combustion, global warming resulting from a large amount of combustion calorie, and the like. In recent years, biodegradable plastics have been extensively developed as a material which can solve the problems of the plastic waste.

Additionally, these biodegradable plastics are of plant origin, and absorb and fix carbon dioxide in the air. Carbon dioxide generated in combustion of these biodegradable plastics of plant origin was originally present in the air, therefore increase in carbon dioxide in the atmosphere is not caused. This phenomenon is referred to as "carbon neutrality", which tends to be placed importance thereon. Carbon dioxide fixation is expected to be effective in preventing the global warming. Particularly, in connection with Kyoto Protocol in which achievement level of carbon dioxide reduction was suggested, deliberation of Congress for ratification was approved in Russia in August 2003. Therefore, it is highly probable that the Protocol will come into effect actually, whereby materials for carbon dioxide fixation have drawn a great deal of attention, and active use thereof has been desired.

Meanwhile, although aromatic polyesters have been produced and consumed in large quantities as general-purpose polymers, in light of fixation of carbon dioxide and prevention of global warming, they are not preferable material in terms of the carbon neutrality, because they are produced from fossil fuels, thereby leading to release of carbon dioxide fixed in the ground to the atmosphere. For example, Patent Document 1 describes that addition of a highly dispersible high-molecular weight vinyl aromatic copolymer to an aromatic polyester enables enhancement of the melt strength. However, as described above, this polyester resin composition is not a preferable material in light of the carbon neutrality.

Accordingly, in light of the carbon neutrality, aliphatic polyester-based resins, particularly polylactic acid-based resins, poly(3-hydroxyalkanoate), more particularly poly[(3-hydroxybutyrate)-co-(3-hydroxyhexanoate)] and the like have been drawn attention as the plastics of plant origin.

However, these resins are problematic in terms of physical properties and molding processability in use without modification. For example, Patent Document 2 describes a thermoplastic resin composition including a graft copolymer prepared using a polylactic acid-based resin, and a polyorganosiloxane/acrylic composite rubber containing polyorganosiloxane and an alkyl (meth)acrylate rubber. However, physical properties, particularly impact resistance and transparency of the resin composition are not enough.

In addition, poly(3-hydroxyalkanoate) copolymers that are biodegradable aliphatic polyester-based resin exhibits significant draw down during melt processing in extrusion molding or vacuum molding, while weld flash is likely to be generated in injection molding. Therefore, improvement of these disadvantages was required.

Moreover, Patent Document 3 describes that molding processability in vacuum molding, air-pressure molding and the like can be improved by compounding an acryl compound to polyester that is a thermoplastic polymer. However, a (3-hydroxyalkanoate) copolymer that is a biodegradable aliphatic polyester-based resin is not referred to as the polyester.
Patent Document 1: Japanese Unexamined Patent Application Publication No. Hei 6-41376;
Patent Document 2: Japanese Unexamined Patent Application Publication No. 2004-285258;
Patent Document 3: Japanese Unexamined Patent Application Publication No. 2002-155207;

DISCLOSURE OF THE INVENTION

Problems to be Solved by the Invention

The present invention solves the aforementioned problems, and an object of the invention is to provide a resin composition that is excellent in processability in molding such as draw down characteristics and the like using a biodegradable polymer of plant origin obtained by actively fixing carbon dioxide around the earth.

Means for Solving the Problems

The present inventors elaborately investigated in order to solve the aforementioned problems, and consequently found that a resin composition that is excellent in processability such as draw down characteristics and the like is obtained by mixing an acrylic modifier having a certain weight average molecular weight with a biodegradable polymer of plant origin obtained by actively fixing carbon dioxide around the earth, whereby the present invention was accomplished.

Accordingly, the present invention relates to a resin composition comprising (A) a biodegradable (3-hydroxyalkanoate) copolymer having a recurring unit represented by the formula (1): [—CHR—CH$_2$—CO—O—] (wherein R represents an alkyl group represented by C$_n$H$_{2n+1}$; and n is an integer of 1 to 15), and 0.1 to 100 parts by weight, based on 100 parts by weight of (A) the biodegradable (3-hydroxyalkanoate) copolymer, of (B) an acrylic modifier having an weight average molecular weight Mw of 500,000 to 10,000,000.

Further, it is preferred that the aforementioned resin composition be prepared by compounding using a master batch such that the acrylic modifier (B) accounts for 0.1 to 100 parts by weight based on 100 parts by weight of the biodegradable (3-hydroxyalkanoate) copolymer (A) in the resin composition,
wherein the master batch comprises 5 to 400 parts by weight of the acrylic modifier (B) based on 100 parts by weight of the biodegradable (3-hydroxyalkanoate) copolymer (A).

Moreover, the resin composition preferably comprises 0.1 to 50 parts by weight of the acrylic modifier (B) based on 100 parts by weight of the biodegradable (3-hydroxyalkanoate) copolymer (A).

Still further, the master batch preferably comprises 5 to 200 parts by weight of the acrylic modifier (B) based on 100 parts by weight of the biodegradable (3-hydroxyalkanoate) copolymer (A).

In addition, it is preferred that the resin composition further comprises a core-shell type graft copolymer (C).

The aforementioned biodegradable (3-hydroxyalkanoate) copolymer (A) is preferably poly[(3-hydroxybutyrate)-co-(3-hydroxyhexanoate)] comprising a (3-hydroxybutyrate) recurring unit and a (3-hydroxyhexanoate) recurring unit.

Furthermore, the biodegradable (3-hydroxyalkanoate) copolymer (A) preferably has a weight average molecular weight Mw of 300,000 to 3,000,000.

The constituent ratio of the recurring units in the poly[(3-hydroxybutyrate)-co-(3-hydroxyhexanoate)] is preferably represented by (3-hydroxybutyrate) unit/(3-hydroxyhexanoate) unit=99/1 to 80/20 (mol/mol).

The difference in refractive indices between the acrylic modifier (B) and the (3-hydroxyalkanoate) copolymer (A) is preferably equal to or less than 0.02.

It is preferred that a core layer of the core-shell type graft copolymer (C) predominantly comprises an acrylic ester, while a shell layer thereof predominantly comprises a methacrylic acid alkyl ester.

It is preferred that the acrylic modifier (B) is a copolymer of predominantly an acrylic ester and a methacrylic ester.

Furthermore, it is preferred that the acrylic modifier (B) comprises a copolymer of predominantly butyl acrylate and methyl methacrylate.

It is preferred that the resin composition further comprises 0.1 to 10 parts by weight of at least one selected from a higher fatty acid amide, an urea derivative and a sorbitol-based compound as a nucleating agent based on 100 parts by weight of total amount of the biodegradable (3-hydroxyalkanoate) copolymer (A) and the acrylic modifier (B).

Moreover, it is preferred that the resin composition further comprises 0.1 to 100 parts by weight of a filler based on 100 parts by weight of total amount of the biodegradable (3-hydroxyalkanoate) copolymer (A) and the acrylic modifier (B).

Hereinafter, the present invention will be explained in detail.

As the biodegradable polymer in the present invention, the (3-hydroxyalkanoate) copolymer (A) having a recurring unit represented by the formula (1): [—CHR—CH$_2$—CO—O—] (wherein R represents an alkyl group represented by C$_n$H$_{2n+1}$; and n is an integer of 1 to 15) may be used in light of excellent degradability under anaerobic conditions and moisture resistance, and possibility of increase in the molecular weight.

Typical examples of the (3-hydroxyalkanoate) copolymer (A) in the present invention include e.g., a (3-hydroxybutyrate)-(3-hydroxyhexanoate) copolymer, a (3-hydroxybutyrate)-(3-hydroxyoctanoate) copolymer, a (3-hydroxybutyrate)-(3-hydroxydecanoate) copolymer, and the like. Among these, poly[(3-hydroxybutyrate)-co-(3-hydroxyhexanoate)] including a (3-hydroxybutyrate) recurring unit and a (3-hydroxyhexanoate) recurring unit is preferred, and the copolymer produced by a microorganism is more preferred. Further, in addition to polyglycolic acid, polylactic acid, poly 3-hydroxybutyric acid, poly 4-hydroxybutyric acid, poly 4-hydroxyvaleric acid, poly 3-hydroxyhexanoic acid or polycaprolactone, one, or two or more kinds of aliphatic polyesters such as polyethylene adipate, polyethylene succinate, polybutylene adipate or polybutylene succinate, or a copolymer prepared with a mixture of the monomers constituting these polymers can be added if necessary, as a polymer including an aliphatic polycarboxylic acid and an aliphatic polyhydric alcohol as main constituents.

Herein, the poly[(3-hydroxybutyrate)-co-(3-hydroxyhexanoate)] is used as a generic name of a copolymer including 3-hydroxybutyrate and 3-hydroxyhexanoate as a principal component. The copolymer may also include the other monomer component as described above as long as 3-hydroxybutyrate and 3-hydroxyhexanoate are included as a principal component. Further, the polymerization process for obtaining the aforementioned copolymer is not particularly limited, and any copolymerization process such as random copolymerization, alternating copolymerization, block copolymerization or the like may be applied. However, because the physical property of the resulting copolymer can be easily controlled, to obtain a random copolymer is more preferable than a block copolymer.

The constituent ratio of the recurring units in poly[(3-hydroxybutyrate)-co-(3-hydroxyhexanoate)] in the present invention is preferably 99/1 to 80/20 (mol/mol), more preferably 98/2 to 82/18 (mol/mol), and still more preferably 97/3 to 85/15 (mol/mol) in terms of (3-hydroxybutyrate) unit/(3-hydroxyhexanoate) unit. The molar fraction (mol %) of (3-hydroxyhexanoate) in poly[(3-hydroxybutyrate)-co-(3-hydroxyhexanoate)] may be abbreviated as HH rate.

The molecular weight of the (3-hydroxyalkanoate) copolymer (A) of the present invention is not particularly limited, and the weight average molecular weight is preferably 300,000 to 3,000,000, more preferably 400,000 to 2,500,000, and still more preferably 500,000 to 2,000,000 in light of the impact resistance and tensile characteristics. When the weight average molecular weight of the (3-hydroxyalkanoate) copolymer is less than 300,000, mechanical characteristics such as strength may be insufficient, while when the weight average molecular weight exceeds 3,000,000, the moldability may be inferior.

The method of measuring the weight average molecular weight of the (3-hydroxyalkanoate) copolymer is not particularly limited, but by way of example, the molecular weight in the resin composition of the present invention can be determined as a molecular weight in terms of the polystyrene equivalent measured with a GPC system manufactured by Waters Corporation equipped with a column Shodex K-804 (polystyrene gel) manufactured by Showa Denko K. K., using chloroform as a mobile phase.

In the present invention, by including the acrylic modifier (B), molding processability can be improved through decreasing weld flash in injection molding, and decreasing the draw down in extrusion molding processing and vacuum molding processing of the resin composition including the (3-hydroxyalkanoate) copolymer.

The draw down characteristic according to the present invention means a marker indicating the shape retention capacity in heat melting, and is determined by using a single screw extruder, LABO PRASTOMILL (manufactured by Toyo Seiki Seisaku-sho, Ltd., type 20C200) equipped with a T die having a width of 150 mm and a lip of 0.25 mm through extrusion under a condition at a processing temperature of 160° C. and a rotation speed of 10 rpm, and measuring as a time period during which the resin starts to be discharged from the die until it reaches to the ground 950 mm below. When the draw down characteristics are favorable, thus determined time will be prolonged.

The acrylic modifier (B) used in the present invention is an acrylic (co)polymer predominantly including one or more acrylic ester or methacrylic ester.

The weight average molecular weight of the acrylic modifier (B) used in the present invention is preferably 500,000 to 10,000,000, more preferably 1,000,000 to 10,000,000, and still more preferably 5,000,000 to 10,000,000 in light of the effect to improve the molding processability. When the weight average molecular weight of the acrylic modifier (B) is less than 700,000, improvement of the draw down characteristics is apt to be insufficient. When the weight average molecular weight of the acrylic modifier (B) exceeds 10,000,000, the surface smoothness of the molded article is apt to be deteriorated. Also, the weight average molecular weight of the acrylic modifier (B) represents the weight average molecular weight in terms of the polystyrene equivalent determined by gel permeation chromatography (GPC), for example the method for the determination of the weight average molecular weight of the (3-hydroxyalkanoate) copolymer described above, or the like.

Examples of the acrylic ester constituting the acrylic modifier (B) used in the present invention include e.g., acrylic acid, methyl acrylate, ethyl acrylate, propyl acrylate, isopropyl acrylate, n-butyl acrylate, isobutyl acrylate, 2-ethylhexyl acrylate, s-butyl acrylate, t-butyl acrylate, neopentyl acrylate, isodecyl acrylate, lauryl acrylate, tridecyl acrylate, stearyl acrylate, benzyl acrylate, tetrahydrofurfuryl acrylate, methoxyethyl acrylate, dimethylaminoethyl acrylate, chloroethyl acrylate, trifluoroethyl acrylate, heptadecafluorooctylethyl acrylate, isobornyl acrylate, adamantyl acrylate, tricyclodecenyl acrylate, and the like.

Examples of the methacrylic ester constituting the acrylic modifier (B) used in the present invention include e.g., methacrylic acid, methyl methacrylate, ethyl methacrylate, n-butyl methacrylate, isobutyl methacrylate, 2-ethylhexyl methacrylate, propyl methacrylate, isopropyl methacrylate, isobutyl methacrylate, s-butyl methacrylate, t-butyl methacrylate, neopentyl methacrylate, ethylhexyl methacrylate, isodecyl methacrylate, lauryl methacrylate, tridecyl methacrylate, stearyl methacrylate, benzyl methacrylate, tetrahydrofurfuryl methacrylate, methoxyethyl methacrylate, dimethylaminoethyl methacrylate, chloroethyl methacrylate, trifluoroethyl methacrylate, heptadecafluorooctylethyl methacrylate, isobornyl methacrylate, adamantyl methacrylate, tricyclodecenyl methacrylate, and the like.

Among them, the acrylic modifier (B) includes preferably a copolymer predominantly including an acrylic ester and a methacrylic ester, and more preferably, a copolymer predominantly including butyl acrylate and methyl methacrylate, in light of excellent surface smoothness of the molded article.

Also, the acrylic modifier (B) of the present invention may be a copolymer which can be obtained by copolymerizing, with the acrylic ester or methacrylic ester monomer, a polyfunctional monomer having two or more polymerizable unsaturated bonds within the molecule, or other copolymerizable monomer, as needed.

The difference in the refractive indices between the biodegradable (3-hydroxyalkanoate) copolymer (A) and the acrylic modifier (B) used in the present invention is preferably equal to or less than 0.02, and more preferably equal to or less than 0.017 in light of improvement of the transparency.

The polymerization process of the acrylic copolymer in the acrylic modifier (B) of the present invention is not particularly limited, but for example, a process for polymerizing by a common emulsion polymerization method (for example, methods described in Japanese Unexamined Patent Application Publication No. Sho 50-88169, and No. Sho 61-141746 and the like) using a radical polymerization initiator and a chain transfer agent, if necessary, and the like may be exemplified.

Herein, the term "predominantly" means that the acrylic copolymer is included at a rate of 50% by weight or more in the acrylic modifier.

In the present invention, the acrylic modifier (B) may be used alone, or two or more thereof may be used in combination.

The amount of the used acrylic modifier (B) in the present invention is 0.1 to 100 parts by weight, preferably 0.1 to 50 parts by weight, more preferably 0.3 to 30 parts by weight, and still more preferably 0.5 to 20 parts by weight based on 100 parts by weight of the biodegradable (3-hydroxyalkanoate) copolymer (A). When the amount of the used acrylic modifier (B) is less than 0.1 parts by weight, the draw down characteristic (molding processability) is apt to be insufficient, while when the amount exceeds 100 parts by weight, the appearance, and physical properties are apt to be impaired.

In the present invention, the method of adding the acrylic modifier (B) to the biodegradable (3-hydroxyalkanoate) copolymer (A) to allow for dispersion is not particularly limited, and for example, a method of adding a predetermined amount of the acrylic modifier (B) at once or a method of adding the same in divided several portions, or a method in which a master batch having a high concentration of the acrylic modifier (B) dispersed in the biodegradable (3-hydroxyalkanoate) copolymer (A) is prepared beforehand, followed by melting and kneading with the biodegradable (3-hydroxyalkanoate) copolymer (A) to permit dilution, and the like are exemplified. In particular, the method in which the previously prepared master batch is used is preferred. According to the method in which such a master batch is used, dispersibility of the acrylic modifier (B) in the resin composition can be improved. Moreover, the surface smoothness, transparency, and tensile characteristic of the resulting molded article can be improved.

The master batch in the present invention includes preferably 5 to 400 parts by weight, more preferably 5 to 200 parts by weight, and still more preferably 5 to 100 parts by weight of the acrylic modifier (B) based on 100 parts by weight of the biodegradable (3-hydroxyalkanoate) copolymer (A). When the acrylic modifier (B) is included less than 5 parts by weight, the effect of improving the draw down characteristics is apt to be deteriorated, while when it is included exceeding 400 parts by weight, dispersibility is apt to be reduced.

Also in the case in which the master batch is used, the rate of the biodegradable (3-hydroxyalkanoate) copolymer (A) to the acrylic modifier (B) in the resin composition is adjusted such that 0.1 to 100 parts by weight of the acrylic modifier (B) is included based on 100 parts by weight of the biodegradable (3-hydroxyalkanoate) copolymer (A). Particularly, the amount of the used component (B) is preferably 0.1 to 50 parts by weight, and more preferably 0.1 to 30 parts by weight based on 100 parts by weight of the component (A). When the amount of the used acrylic modifier (B) is less than 0.1 parts by weight, the draw down characteristic (molding processability) is apt to be insufficient, while when the amount exceeds 100 parts by weight, the appearance, and physical properties are apt to be impaired.

It is preferred that the resin composition of the present invention further includes a core-shell type graft copolymer (C). The core-shell type graft copolymer (C) used in the present invention includes an acrylic rubber as a core layer, and a polymer containing a vinyl monomer as a shell layer. The core-shell type graft copolymer (B) includes a polymer obtained by polymerizing a specified monomer mixture, and the impact resistance/transparency balance can be improved without deteriorating physical and/or chemical characteristics of the biodegradable (3-hydroxyalkanoate) copolymer (A).

The acrylic rubber polymer that forms the core layer of the core-shell type graft copolymer (C) of the present invention may have a layer structure with only one layer, or may have a multilayer structure with two or more layers. Similarly, the polymer that forms the shell layer may have a layer structure with only one layer, or may have a multilayer structure with two or more layers. Generally, the core-shell type graft polymer is obtained by graft copolymerization of a rubber polymer and a monomer mixture, and in many cases, obtained by graft copolymerization of a monomer mixture in the presence of a rubber latex containing a rubber polymer as the solid content.

The acrylic rubber polymer that forms the core layer of the core-shell type graft copolymer (C) of the present invention is preferably a polymer obtained by polymerization of a monomer mixture including 50 to 100% by weight of an acrylic acid alkyl ester monomer when total weight of the monomers constituting the rubber polymer is defined as 100% by weight. If necessary, 0 to 50% by weight of a monomer selected from the group consisting of an aromatic vinyl monomer, a vinyl monomer that is copolymerizable with an acrylic acid alkyl ester monomer and/or aromatic vinyl monomer may be included as the other component. Further, 0 to 5% by weight of a polyfunctional monomer having two or more polymerizable unsaturated bonds within the molecule may be also included as needed. The rubber latex containing a rubber polymer can be obtained by subjecting the mixture of these monomers to, for example, emulsion polymerization. When the rubber polymer is obtained by an emulsion polymerization method, the rubber polymer as it is in the state of the rubber latex dispersed in an aqueous medium can be used in graft copolymerization with the monomer mixture.

Specific examples of the acrylic acid alkyl ester monomer include e.g., acrylic acid alkyl esters having an alkyl group having 1 to 8 carbon atoms such as methyl acrylate, ethyl acrylate, butyl acrylate, 2-ethylhexyl acrylate, and the like, but not limited thereto. These may be used alone, or two or more thereof may be used in combination.

The amount of the used acrylic acid alkyl ester monomer in the acrylic rubber polymer that forms the core layer of the core-shell type graft copolymer (C) of the present invention is preferably 50 to 100% by weight, more preferably 60 to 95% by weight, and still more preferably 65 to 95% by weight when the total weight of the monomers that constitute the rubber polymer is defined as 100% by weight. When the amount of the used acrylic acid alkyl ester monomer is less than 50% by weight, impact resistance of the finally obtained molded article may not be improved enough.

The aromatic vinyl monomer in the acrylic rubber polymer that forms the core layer of the core-shell type graft copolymer (C) of the present invention is a component having an action to improve transparency of the molded article finally obtained from the biodegradable resin composition of the present invention, and is a component for adjusting to give a small difference between the refractive index of the core-shell type graft copolymer (C) and the refractive index of the biodegradable (3-hydroxyalkanoate) copolymer (A). Specific examples of the aromatic vinyl monomer include e.g., styrene, α-methylstyrene, 1-vinylnaphthalene, 2-vinylnaphthalene and the like, but not limited thereto. However, for adjusting the refractive index, the aforementioned aromatic vinyl monomer may or may not be used.

In the acrylic rubber polymer that forms the core layer of the core-shell type graft copolymer (C) of the present invention, the aromatic vinyl monomer may be used within the range of 0 to 50% by weight based on 100% by weight as defined by total weight of the monomers that constitute the rubber polymer. When this amount exceeds 50% by weight, relative amount of the used acrylic acid alkyl ester monomer becomes so low that the rubber polymer that is excellent in impact resistance is apt to be hardly obtained. It should be noted that when importance is attached to the impact-resisting strength, the amount is preferably 0 to 25% by weight, and more preferably 0% by weight.

The difference in refractive indices between the biodegradable (3-hydroxyalkanoate) copolymer (A) and the core-shell type graft copolymer (C) used in the present invention is preferably equal to or less than 0.02, and more preferably equal to or less than 0.017 in light of improvement of the transparency.

The vinyl monomer that is copolymerizable with the acrylic acid alkyl ester monomer and/or the aromatic vinyl monomer in the acrylic rubber polymer that forms the core layer of the core-shell type graft copolymer (C) of the present invention is a component for finely adjusting the compatibility of the core-shell type graft copolymer (C) with the biodegradable (3-hydroxyalkanoate) copolymer (A). Specific examples of these copolymerizable vinyl monomers include e.g., methacrylic acid alkyl esters having an alkyl group having 1 to 20 carbon atoms such as methyl methacrylate, ethyl methacrylate and butyl methacrylate; vinyl cyanide monomers such as acrylonitrile and methacrylonitrile; 4-hydroxybutyl acrylate, and the like, but not limited thereto.

In the acrylic rubber polymer that forms the core layer of the core-shell type graft copolymer (C) of the present invention, the vinyl monomer that is copolymerizable with the acrylic acid alkyl ester monomer and/or the aromatic vinyl monomer may be used in the range of 0 to 50% by weight when the total amount of the monomers constituting the rubber polymer is defined as 100% by weight. Preferably, the vinyl monomer may be included at 0 to 10% by weight, and more preferably at 0% by weight. When the copolymerizable vinyl monomer is included exceeding 50% by weight, relative amount of the used acrylic acid alkyl ester monomer becomes so low that the rubber polymer that is excellent in impact resistance may be hardly obtained.

The polyfunctional monomer in the acrylic rubber polymer that forms the core layer of the core-shell type graft copolymer (C) of the present invention is a component for forming the cross-linked structure in the resulting rubber polymer. Specific examples of the polyfunctional monomer include e.g., divinylbenzene, allyl acrylate, allyl methacrylate, diallyl phthalate, triallyl cyanurate, triallyl isocyanurate, diacrylate-based compounds, dimethacrylate-based compounds and the like, but not limited thereto. In addition, a molecule having a radical polymerizable functional group at both ends referred to as macromer, for example, α,ω-dimethacryloyloxy polyoxyethylene can be also used as the polyfunctional monomer.

In the acrylic rubber polymer that forms the core layer of the core-shell type graft copolymer (C) of the present invention, the polyfunctional monomer may be used in the range of 0 to 5% by weight when total weight of the monomers constituting the rubber polymer is defined as 100% by weight. Preferably, 0.1 to 3% by weight is included. This amount exceeding 5% by weight is not preferred because the relative amount of the used acrylic acid alkyl ester monomer becomes so low that the rubber polymer that is excellent in impact resistance may be hardly obtained.

The method of obtaining the acrylic rubber polymer in the present invention is not particularly limited, a method in which: a monomer mixture containing a monomer of an acrylic acid alkyl ester, an aromatic vinyl monomer, a vinyl monomer that is copolymerizable with these monomers, and a polyfunctional monomer in each predetermined amount is compounded with an aqueous medium, a polymerization initiator, an emulsifying agent and the like; and for example, the mixture is allowed to be polymerized by a common emulsion polymerization method, whereby the rubber polymer is obtained in the state included in a rubber latex, and the like may be employed.

The addition and polymerization of the monomer mixture in obtaining the rubber polymer is not particularly limited, and may be carried out in one step, or may be carried out in multiple steps. The method for adding the monomer mixture is not particularly limited, and may be added together in a lump, added serially, or added in two or more steps in divided portions. Also, a variety of addition processes may be employed in combination.

The monomer mixture can be also obtained in the form of a micelle by: introducing a monomer of an acrylic acid alkyl ester, an aromatic vinyl monomer, a vinyl monomer that is copolymerizable therewith, and a polyfunctional monomer each independently, or any combination of some of these separately into a reaction vessel to which an aqueous medium, an initiator, an emulsifying agent and the like had been introduced beforehand; and then mixing by stirring in the reaction vessel. In this case, the rubber polymer can be obtained in the state included in the rubber latex by changing the condition in the reaction vessel to allow the polymerization to be initialized, for polymerizing the monomer mixture by a common emulsion polymerization method, for example.

Thus obtained acrylic rubber polymer preferably has a glass transition temperature of equal to or lower than 0° C., and more preferably equal to or lower than −30° C. When the acrylic rubber polymer has a glass transition temperature exceeding 0° C., finally obtained molded article may fail to absorb impact when a great deformation rate is applied.

The monomer mixture constituting the shell layer of the core-shell type graft copolymer (C) of the present invention preferably includes 70 to 100% by weight of at least one vinyl monomer selected from the group consisting of a vinyl cyanide monomer, an aromatic vinyl monomer, an acrylic ester and a methacrylic ester, and 0 to 30% by weight of other vinyl monomer that is copolymerizable with the vinyl monomer. More preferably, it includes 10 to 100% by weight of the methacrylic acid alkyl ester monomer, 0 to 60% by weight of the acrylic acid alkyl ester monomer, 0 to 90% by weight of the aromatic vinyl monomer, 0 to 40% by weight of the vinyl cyanide monomer, and 0 to 20% by weight of the vinyl monomer that is copolymerizable therewith, with total amount of them accounting for 100% by weight.

The methacrylic acid alkyl ester monomer in the shell layer of the core-shell type graft copolymer (C) of the present invention is a component that is preferable for improving the adhesiveness of the graft polymer and the biodegradable aliphatic polyester resin, and for enhancing the impact-resisting strength of the finally obtained molded article of the present invention. Specific examples of the methacrylic acid alkyl ester monomer include e.g., methacrylic acid alkyl esters having an alkyl group having 1 to 5 carbon atoms such as methyl methacrylate, ethyl methacrylate, butyl methacrylate and the like, but not limited thereto.

In the shell layer of the core-shell type graft copolymer (C) of the present invention, the methacrylic acid alkyl ester monomer can be used in the range of preferably 10 to 100% by weight, more preferably 20 to 100% by weight, and still more preferably 30 to 100% by weight when total weight of the vinyl monomer is defined as 100% by weight. When the methacrylic acid alkyl ester monomer is less than 10% by weight, the impact-resisting strength of the finally obtained molded article may not be sufficiently enhanced. In addition, by including methyl methacrylate in the methacrylic acid alkyl ester monomer in an amount of preferably 60 to 100% by weight, and more preferably 80 to 100% by weight, impact-resisting strength of the finally obtained molded article can be enhanced.

The acrylic acid alkyl ester monomer in the shell layer of the core-shell type graft copolymer (C) of the present invention is a component for facilitating favorable dispersion of the graft polymer in the biodegradable aliphatic polyester resin in the finally obtained molded article, and for enhancing the impact-resisting strength of the molded article by adjusting the softening temperature of the shell layer of the graft polymer. Specific examples of the acrylic acid alkyl ester monomer include e.g., acrylic acid alkyl esters having an alkyl group having 1 to 12 carbon atoms such as methyl acrylate, ethyl acrylate, butyl acrylate, 2-ethylhexyl acrylate and the like, but not limited thereto.

In the shell layer of the core-shell type graft copolymer (C) of the present invention, the acrylic acid alkyl ester monomer can be used in the range of 0 to 60% by weight, preferably 0 to 50% by weight, and more preferably 0 to 40% by weight when total weight of the vinyl monomer is defined as 100% by weight. When the acrylic acid alkyl ester monomer exceeds 60% by weight, relative amount of the used methacrylic acid alkyl ester monomer becomes so low that the impact-resisting strength of the finally obtained molded article may not be sufficiently enhanced.

The monomer in the shell layer of the core-shell type graft copolymer (C) of the present invention, the aromatic vinyl monomer, has an action to improve the transparency of the finally obtained molded article, and thus is a component for adjusting such that the difference between the refractive index of the graft polymer and the refractive index of the biodegradable aliphatic polyester resin becomes as small as possible. Specific examples of the aromatic vinyl monomer include e.g., the monomers illustrated as the specific examples of the aromatic vinyl monomer, but not limited thereto.

In the shell layer of the core-shell type graft copolymer (C) of the present invention, the aromatic vinyl monomer can be used in the range of 0 to 90% by weight, preferably 0 to 50% by weight, and more preferably 0 to 30% by weight when total weight of the vinyl monomer is defined as 100% by weight. When the aromatic vinyl monomer exceeds 90% by weight, relative amount of the used methacrylic acid alkyl ester monomer becomes so low that the impact-resisting strength of the finally obtained molded article may not be sufficiently enhanced.

The vinyl cyanide monomer in the shell layer of the core-shell type graft copolymer (C) of the present invention is a component for finely controlling the compatibility of the graft polymer with the biodegradable aliphatic polyester resin. Specific examples of the vinyl cyanide monomer include e.g., acrylonitrile, methacrylonitrile and the like, but not limited thereto. These may be used alone, or two or more thereof may be used in combination.

In the shell layer of the core-shell type graft copolymer (C) of the present invention, the vinyl cyanide monomer can be used in the range of 0 to 40% by weight, and more preferably 0% by weight when total weight of the vinyl monomer is defined as 100% by weight. When the vinyl cyanide exceeds 40% by weight, relative amount of the used methacrylic acid alkyl ester monomer becomes so low that the impact-resisting strength of the finally obtained molded article may not be sufficiently enhanced.

The vinyl monomer in the shell layer of the core-shell type graft copolymer (C) of the present invention, which is copolymerizable therewith, is a component for improving the processability in molding of the biodegradable aliphatic polyester resin composition. Specific examples of the vinyl monomer include e.g., 4-hydroxybutyl acrylate, glycidyl methacrylate and the like, but not limited thereto.

In the shell layer of the core-shell type graft copolymer (C) of the present invention, the vinyl monomer that is copolymerizable therewith can be used in the range of 0 to 20% by weight, preferably 0 to 10% by weight, and more preferably 0% by weight. When the vinyl monomer that is copolymerizable therewith exceeds 20% by weight, relative amount of the used methacrylic acid alkyl ester monomer becomes so low that the impact-resisting strength of the finally obtained molded article may not be sufficiently enhanced.

The core-shell type graft copolymer (C) used in the present invention is obtained by graft copolymerization of the acrylic rubber polymer and the monomer mixture. The monomer mixture provides the shell layer polymer of the core-shell type graft copolymer (C) as a result of the graft copolymerization.

The proportion of the acrylic rubber polymer corresponding to a core layer, and the polymer corresponding to the shell layer of the core-shell type graft polymer (C) used in the present invention may be: the rubber polymer of 5 to 95 parts by weight and the shell layer polymer of 95 to 5 parts by weight, and preferably the rubber polymer of 50 to 95 parts by weight and the shell layer polymer of 50 to 5 parts by weight. The rubber polymer being less than 5 parts by weight, and the shell layer polymer being more than 95 parts by weight are not preferred because the impact-resisting strength of the finally obtained molded article may not be sufficiently enhanced. In addition, when the rubber polymer is more than 95 parts by weight, and the shell layer polymer is less than 5 parts by weight, adhesiveness between the graft polymer and the biodegradable aliphatic polyester resin may be deprived, whereby the impact-resisting strength, and transparency of the finally obtained molded article of the present invention may not be sufficiently improved.

The method of obtaining the core-shell type graft copolymer (C) of the present invention is not particularly limited, and a method in which a monomer mixture containing a methacrylic acid alkyl ester monomer, an acrylic acid alkyl ester monomer, an aromatic vinyl monomer, a vinyl cyanide monomer and a copolymerizable vinyl monomer in each desirable amount is added to a rubber latex including an acrylic rubber polymer having a glass transition temperature of not higher than 0° C. prepared as described above, and then polymerization is allowed by a common polymerization method through compounding a polymerization initiator or the like to obtain a powdery graft polymer from the graft polymer latex, and the like may be employed.

The addition of the monomer mixture as the shell layer, and polymerization of the same are not particularly limited, and may be carried out in one step, or in multiple steps. The addition of the monomer mixture is not particularly limited, and may be added together in a lump, added serially, or added by dividing to carry out in two or more steps, and in combination of these procedures.

The particles in thus obtained core-shell type graft copolymer (C) latex may be recovered from the latex by salt precipitation and coagulation through adding a common electrolyte or acid, and spraying and drying in hot air. Moreover, washing, dehydration, and drying may be carried out by any common methods as needed.

The method of adding the resulting core-shell type graft copolymer (C) to the resin composition is not particularly limited, and for example, a method of adding a predetermined amount of the core-shell type graft copolymer (C) at once or a method of adding the same in divided several portions, or a method in which it is added together with the acrylic modifier (B) to the aforementioned master batch may be exemplified.

In the resin composition of the present invention, moldability can be further improved by adding a nucleating agent.

The nucleating agent used in the present invention may be for example, a higher fatty acid amide, an urea derivative, a sorbitol-based compound, a boron nitride, a higher fatty acid salt, an aromatic fatty acid salt and the like, which may be used singly, or two or more thereof in combination. Among them, because of high effect as the nucleating agent, the higher fatty acid amide, the urea derivative, and the sorbitol-based compound are preferred.

The aforementioned higher fatty acid amide is preferably a fatty acid amide having 10 to 50 carbon atoms per molecule, and for example, behenic acid amide, oleic acid amide, erucic acid amide, stearic acid amide, palmitic acid amide, N-stearylbehenic acid amide, N-stearylerucic acid amide, ethylenebisstearic acid amide, ethylenebisoleic acid amide, ethylenebiserucic acid amide, ethylenebislauryl acid amide, ethylenebiscapric acid amide, p-phenylenebisstearic acid amide, a polycondensation product of ethylene diamine, stearic acid and sebacic acid, and the like may be exemplified. Particularly, behenic acid amide is preferred.

As the urea derivative, bis(stearylureide)hexane, 4,4'-bis(3-methylureide)diphenylmethane, 4,4'-bis(3-cyclohexylureide)diphenylmethane, 4,4-bis(3-cyclohexylureide)dicyclohexylmethane, 4,4'-bis(3-phenylureide) dicyclohexylmethane, bis(3-methylcyclohexylureide) hexane, 4,4'-bis(3-decylureide)diphenylmethane, N-octyl-N'-phenylurea, N,N'-diphenylurea, N-tolyl-N'-cyclohexylurea, N,N-dicyclohexylurea, N-phenyl-N'-tribromophenylurea, N-phenyl-N'-tolylurea, N-cyclohexyl-N'-phenylurea, and the like may be illustrated, and particularly bis(stearylureide)hexane is preferred.

Examples of the sorbitol-based compound include 1,3,2,4-di(p-methylbenzylidene)sorbitol, 1,3,2,4-dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-ethylbenzylidene)sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene) sorbitol, 1,3,2,4-di(p-t-butylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorbenzylidenesorbitol, 1,3-p-chlorbenzylidene-2,4-benzylidenesorbitol, 1,3-p-chlorbenzylidene-2,4-p- methylbenzylidenesorbitol, 1,3-p-chlorbenzylidene-2,4-p-ethylbenzylidenesorbitol, 1,3-p-methylbenzylidene-2,4-p-chlorbenzylidenesorbitol, 1,3-p-ethylbenzylidene-2,4-p-chlorbenzylidenesorbitol, 1,3,2,4-di(p-chlorbenzylidene) sorbitol, and the like. Among these, 1,3,2,4-di(p-methylbenzylidene)sorbitol, and 1,3,2,4-dibenzylidenesorbitol are preferred.

The amount of the used nucleating agent in the resin composition of the present invention is preferably 0.1 to 10 parts by weight, more preferably 0.2 to 8 parts by weight, and still more preferably 0.5 to 5 parts by weight based on 100 parts by weight of total amount of the biodegradable (3-hydroxyalkanoate) copolymer (A) and the acrylic modifier (B), in light of the moldability. When the amount is less than 0.1 parts by weight, the effect as the nucleating agent can be insufficient, while when the amount exceeds 10 parts by weight, the effect can be saturated, leading to economical disadvantage, and the appearance and the physical properties can be impaired.

In the resin composition of the present invention, the modulus of elasticity in flexure, heat resistance and the like can be further improved by further adding the filler.

Among the aforementioned fillers, examples of the inorganic filler include carbon black, calcium carbonate, silicon oxide and silicic acid salts, zinc white, Hycite clay, kaolin, basic magnesium carbonate, mica, talc, quartz powder, diatomaceous earth, dolomite powder, titanium oxide, zinc oxide, antimony oxide, barium sulfate, calcium sulfate, alumina, calcium silicate and the like, and particularly, mica and talc having a particle size of 0.1 to 30 μm are preferred.

In addition, examples of the other filler include inorganic fibers such as carbon fiber, and organic fibers such as human hair and sheep wool. Moreover, natural fibers such as bamboo fibers, pulp fibers, kenaf fibers, analogous other plant alternatives, annual herb plants of genus *Hibiscus* in family Malvaceae, annual herb plants of family Tiliaceae, and the like can be also used. In light of reduction in carbon dioxide, natural fibers of plant origin are preferred, and particularly, kenaf fibers are preferred.

The amount of the used filler in the resin composition of the present invention, is preferably 0.1 to 100 parts by weight, more preferably 0.1 to 80 parts by weight, and still more preferably 0.1 to 50 parts by weight based on 100 parts by weight of total amount of the biodegradable (3-hydroxyalkanoate) copolymer (A) and the acrylic modifier (B), in light of physical properties, moldability, and costs. When the filler is less than 0.1 parts by weight, less improvement of the physical properties is likely to be achieved, while the filler exceeding 100 parts by weight is apt to result in lowering of the impact strength.

A plasticizer can be also used in combination, in the resin composition of the present invention in the range not to inhibit the effect of the present invention. Use of the plasticizer enables the melt viscosity during heat processing, particularly during extrusion processing to be lowered, and can suppress the lowering of the molecular weight due to heat generation upon shearing. In some cases, improvement of the crystallization rate can be expected, and further, when a film or a sheet is obtained as the molded article, elongation and the like can be imparted. Although the plasticizer is not particularly limited, the followings can be illustrated. As the plasticizer of the aliphatic polyester-based biodegradable polyester, ether-based plasticizers, ester-based plasticizers, phthalic acid-based plasticizers, phosphorus-based plasticizers and the like are preferred, and the ether-based plasticizers and the ester-based plasticizers are more preferred in light of excellent compatibility with the polyester. As the ether-based plasticizer, for example, polyoxyalkylene glycols such as polyethylene glycol, polypropylene glycol, polytetramethylene glycol and the like can be exemplified. In addition, as the ester-based plasticizer, esters of an aliphatic dicarboxylic acid with an aliphatic alcohol may be exemplified. As the aliphatic dicarboxylic acid, for example, oxalic acid, succinic acid, sebacic acid, adipic acid and the like may be exemplified, while as the aliphatic alcohol, for example, monohydric alcohols such as methanol, ethanol, n-propanol, isopropanol, n-hexanol, n-octanol, 2-ethylhexanol, n-dodecanol, and stearyl alcohol; dihydric alcohols such as ethylene glycol, 1,2-propylene glycol, 1,3-propylene glycol, 1,4-butanediol, 1,5-pentanediol, 1,6-hexanediol, diethylene glycol, neopentyl glycol, and polyethylene glycol; as well as polyhydric alcohols such as glycerin, trimethylolpropane, pentaerythritol and the like may be exemplified. Additionally, any copolymer such as a di-copolymer, a tri-copolymer, a tetra-copolymer and the like including any combination of two or more of the aforementioned polyether and polyester, as well as blends of two or more selected from these homopolymers, copolymers and the like may be exemplified. Furthermore, esterified hydroxycarboxylic acid and the like may be also suggested. The aforementioned plasticizer may be used alone, or two or more thereof may be used in combination.

Moreover, to the composition of the present invention a known thermoplastic resin, or thermosetting resin can be added in the range not to inhibit the effect of the present invention. Typical examples of the thermoplastic resin include general-purpose thermoplastic resins such as polyolefin-based resins e.g., polypropylene and polyethylene, polyvinyl chloride-based resins, polystyrene-based resins, ABS-based resins and the like, as well as general-purpose engineering plastics such as polyethylene terephthalate-based resins, polybutylene terephthalate-based resins, polycarbonate-based resins, polyamide-based resins and the like. In addition, epoxy resins and the like may be exemplified as a typical thermosetting resin. In addition thereto, any of known resin modifiers, processability improving agents can be used.

Into the resin composition of the present invention can be compounded a colorant such as a pigment or a dye, an odor absorbent such as activated charcoal or zeolite, a flavor such as vanillin or dextrin, a stabilizer such as an antioxidant, an anti-oxidizing agent, a weather resistance improving agent and an ultraviolet absorbing agent, a lubricant, a release agent, a water repellent agent, an antimicrobial agent, a slidability improving agent, and other secondary additive as needed. The aforementioned additives may be used alone, or two or more thereof may be used in combination.

The resin composition of the present invention can be produced by a known method. For example, as the method of heat melting and mixing, mixing by mechanical agitation with a single screw extruder, a twin screw extruder, a kneader, a gear pump, a kneading roll, a tank having a stirrer or the like, or application of a static mixer in which dividing and joining of the flow are repeated by a flow guide apparatus may be exemplified. In the case of heat melting, it is necessary to mix with attention to lowering of the molecular weight resulting from the thermal degradation. In addition, there is also a method of obtaining the resin composition of the present invention including dissolving in a solvent to permit dissolution, and thereafter removing the solvent.

The resin composition of the present invention can be processed by injection molding, or extrusion molding. Further, using the extrusion molding machine as described above, it may be processed into the shape of block, film, sheet or the like. After pelletizing once so as to provide favorable dispersibility of various components, the product may be processed into the shape of film or sheet by an extrusion molding machine. Alternatively, processing to obtain a film or sheet is enabled with a calender molding machine, a roll molding machine, or an inflation molding machine. Moreover, the film or the sheet obtained from the resin composition of the present invention can be subjected to thermal molding by heat, vacuum molding, press molding or the like. In addition, the resin composition of the present invention can be subjected to hollow molding by a blow molding machine.

The resin composition of the present invention is formed into molded articles such as a variety of fiber, string, rope, woven fabric, knit fabric, nonwoven fabric, paper, film, sheet, tube, plate, bar, vessel, bag, accessory, foam and the like, which may be used alone. Alternatively, it can be used by combining with a variety of fiber, string, rope, woven fabric, knit fabric, nonwoven fabric, paper, film, sheet, tube, plate, bar, vessel, bag, accessory, foam or the like constituted with a simple substance other than this composition to improve the physical property of the simple substance. The molded article obtained in this manner can be suitably used in fields such as agriculture, fishery, forestry, horticulture, medicine, sanitary goods, food industry, clothing, nonclothing, packaging, automobile, building material, and others.

EFFECTS OF THE INVENTION

According to the present invention, a resin composition and a molded article can be provided which can contribute to prevention of global warming, and are excellent in molding processability to allow the draw down in extrusion molding and vacuum molding, and weld flash in injection molding to be reduced. Still more, by compounding the acrylic modifier (B) using a master batch, the surface smoothness, transparency, tensile characteristic of the molded article can be improved.

BEST MODE FOR CARRYING OUT THE INVENTION

Next, the composition of the present invention, and the molded article thereof will be explained in more detail by way of Examples, but the present invention is not limited just to these Examples.

First Example

The resins and additives used in this Example are as follows.
A-1: PHBH
poly[(3-hydroxybutyrate)-co-(3-hydroxyhexanoate)] (HH rate=12 mol %, Mw=500,000)
A-2: PHBH
poly[(3-hydroxybutyrate)-co-(3-hydroxyhexanoate)] (HH rate=7 mol %, Mw=500,000)
B-1: acrylic modifier (manufactured by KANEKA CORPORATION, Kane ace PA10; Mw=800,000)
B-2: acrylic modifier (manufactured by KANEKA CORPORATION, Kane ace PA20; Mw=1,000,000)
B-3: acrylic modifier (manufactured by KANEKA CORPORATION, Kane ace PA40; Mw=6,000,000)
B-4: acrylic modifier (manufactured by KANEKA CORPORATION, Kane ace PA60; Mw=8,000,000)
C-1: nucleating agent, behenic acid amide (manufactured by CRODA JAPAN KK, Incroslip B)
D-1: hindered pheolic antioxidant (manufactured by Ciba Specialty Chemicals Holding Inc., IRGANOX-1010)
PHBH having an HH rate of 7 mol % (A-1) or 12 mol % (A-2), and a Mw (weight average molecular weight) of each about 500,000, produced using *Alcaligenes eutrophus* AC32 (J. Bacteriol., 179, 4821 (1997)) which had been prepared by introducing a PHA (polyhydroxyalkanoate) synthetic enzyme gene derived from *Aeromonas caviae* into *Alcaligenes eutrophus* as a microorganism through appropriately adjusting the raw material and culture conditions was used.

The methods of evaluation of thus resulting resin composition were as follows.
<Evaluation of Draw Down Characteristic>
Thus resulting resin composition was extruded using a single screw extruder, LABO PRASTOMILL (manufactured by Toyo Seiki Seisaku-sho, Ltd., type 20C200) equipped with a T die having a width of 150 mm and a lip of 0.25 mm under a condition at a processing temperature of 160° C. and a rotation speed of 10 rpm. Then, a time period during which the resin starts to be discharged from the die until it reaches to the ground 950 mm below was measured. When the draw down characteristic is favorable, thus determined time would be prolonged.
<Evaluation of Vacuum Molding Elongation Characteristic>
The resulting resin composition was extruded using a single screw extruder (screw diameter: φ40 mm) equipped with a T die having a width of 350 mm and a lip thickness of 0.25 mm under a condition at a processing temperature of 160° C. and a rotation speed of 15 rpm to give a sheet having a thickness of 0.4 mm. With respect to the test piece (length 330 mm×width 330 mm) cut out from the resulting sheet, a molded article was obtained by carrying out vacuum molding using a vacuum molding machine (Semba System VAS66-4.5T) with a convex shape mold (width 150 mm×length 200 mm×height 30 m). The heating conditions of the sheet in vacuum molding were regulated so as to give a sheet surface temperature of 150° C. Elongation characteristic of the heated sheet in the vacuum molding was evaluated from the appearance of the resulting molded article.

The evaluation standards are as follows.
A: satisfactory elongation characteristic, without generation of break in the molded article;
C: unsatisfactory elongation characteristic, with generation of break in the molded article.
<Evaluation of Weld Flash Characteristic in Injection Molding>
The resulting resin composition was subjected to injection molding using a 75-ton injection molding machine (manufactured by NISSEI PLASTIC INDUSTRIAL CO., LTD., IS75E), and a flat plate mold having a size of 120×120×3 mm in thickness under the following molding condition. Accordingly, the state of generation of weld flash in molding was evaluated. The injection molding was carried out under a molding condition with: mold temperature of 60° C., molding temperature of 160° C., injection speed of 15%, injection pressure of 50%, pressure dwell of 15%, cooling time of 20 sec.

The evaluation standards are as follows.
A: almost no weld flash generated; and
C: weld flash greatly generated.

Examples 1 to 12

A mixture of poly[(3-hydroxybutyrate)-co-(3-hydroxyhexanoate)] (PHBH), an acrylic modifier, a nucleating agent and an antioxidant with a compounding proportion shown in Table 1 was subjected to melt kneading using a twin screw extrusion molding machine (manufactured by Japan Steel Works, Ltd., TEX30α) at a cylinder preset temperature of 130° C., whereby a composition pellet was obtained.

Thus resulting composition was evaluated on the draw down characteristic, elongation characteristic in vacuum molding, and weld flash characteristic in injection molding. The results are shown in Table 1.

Comparative Examples 1 to 3

The draw down characteristic was evaluated by a similar operation to that in Example 1 with the compounding proportion shown in Table 2.

antioxidant: hindered pheolic antioxidant (manufactured by Ciba Specialty Chemicals Holding Inc., IRGANOX-1010)

The methods of evaluation in Examples of the present invention were as follows.

<Evaluation of Draw Down Characteristic>

The evaluation was made by a similar manner to the aforementioned Examples 1 to 12.

<Tensile Test (Measurement of Maximum Tensile Strength, Breaking Strength, Elongation at Break, and Modulus of Elasticity)>

TABLE 1

|  | unit | Example 1 | 2 | 3 | 4 | 5 | 6 | 7 | 8 | 9 |
|---|---|---|---|---|---|---|---|---|---|---|
| (A-1) PHBH (HH rate 12 mol %) | part by weight | 100 | 100 | 100 | 100 | 100 | 100 | 100 | 100 | 100 |
| (A-2) PHBH (HH rate 7 mol %) | | | | | | | | | | |
| (B-1) acrylic modifier PA10 | | 1 | | | | | 0.5 | | | |
| (B-2) acrylic modifier PA20 | | | 1 | | | | | | | |
| (B-3) acrylic modifier PA40 | | | | 1 | | | | | | |
| (B-4) acrylic modifier PA60 | | | | | 1 | 0.5 | 0.5 | 5 | 10 | 20 |
| (C-1) nucleating agent | | 1 | 1 | 1 | 1 | 1 | 1 | 1 | 1 | 1 |
| (D-1) antioxidant | | 0.2 | 0.2 | 0.2 | 0.2 | 0.2 | 0.2 | 0.2 | 0.2 | 0.2 |
| Draw down characteristic | (sec) | 59 | 65 | 74 | 73 | 70 | 69 | 78 | 85 | 97 |
| Elongation characteristic in vacuum molding | — | A | A | A | A | A | A | A | A | A |
| Weld flash characteristic in injection molding | — | A | A | A | A | A | A | A | A | A |

TABLE 2

|  | unit | Example 10 | 11 | 12 | Comparative Example 1 | 2 | 3 |
|---|---|---|---|---|---|---|---|
| (A-1) PHBH (HH rate 12 mol %) | part by weight | | | | 100 | | 100 |
| (A-2) PHBH (HH rate 7 mol %) | | 100 | 100 | 100 | | 100 | |
| (B-1) acrylic modifier PA10 | | | | 1 | | | |
| (B-2) acrylic modifier PA20 | | | | | | | |
| (B-3) acrylic modifier PA40 | | | | | | | |
| (B-4) acrylic modifier PA60 | | 1 | 0.5 | | | | 0.05 |
| (C-1) nucleating agent | | 1 | 1 | 1 | 1 | 1 | 1 |
| (D-1) antioxidant | | 0.2 | 0.2 | 0.2 | 0.2 | 0.2 | 0.2 |
| Draw down characteristic | (sec) | 71 | 70 | 63 | 26 | 29 | 30 |
| Elongation characteristic in vacuum molding | — | A | A | A | C | C | C |
| Weld flash characteristic in injection molding | — | A | A | A | C | C | C |

From the results shown in Table 1 and Table 2, it was proven that Examples 1 to 12 exhibited a long time period until the samples drawn down, and were excellent in molding processability, as compared with Comparative Examples 1 to 3. Thus, it is clear that range of molding conditions in the molding processing are thereby extended.

Second Example

The resins and additives used in this Example are as follows.
PHBH: poly[(3-hydroxybutyrate)-co-(3-hydroxyhexanoate)] (HH rate: molar fraction (mol %) of 3-hydroxyhexanoate in PHBH being 12%) (refractive index: 1.485)
M-400: core-shell type graft copolymer including an acrylic rubber as a core layer, and a polymer constituted with a vinyl monomer as a shell layer (manufactured by KANEKA CORPORATION, refractive index: 1.468)
nucleating agent: behenic acid amide (manufactured by CRODA JAPAN KK, Incroslip B) PA-60: acrylic modifier, Mw=8,000,000 (manufactured by KANEKA CORPORATION, refractive index: 1.485)

A dumbbell for testing was punched out from the resulting sheet, and maximum tensile strength, breaking strength, elongation at break, and modulus of elasticity were measured using an autograph (manufactured by Shimadzu Corporation), in accordance with JIS K7113. Each measurement was made with respect to both longitudinal direction (MD) and crosswise direction (TD) of the sheet.

<Evaluation of Surface Smoothness of Sheet>

Using a sheet produced with a T die extruder, surface state of the sheet was visually evaluated judging from the presence of granular structure (block object). Evaluation standards are as follows.
A: granular structure scarcely present;
B: granular structure present a little; and
C: a great deal of granular structure present.

<(Visual) Observation of Transparency>

The sheet used in the aforementioned tensile test was visually evaluated. Evaluation standards are as follows.
A: satisfactorily transparent;
B: poorly transparent; and
C: not transparent.

Examples 13 to 15

PHBH having an HH rate of 12 mol %, and a Mw (weight average molecular weight) of about 500,000, produced using *Alcaligenes eutrophus* AC32 (J. Bacteriol., 179, 4821 (1997)) which had been prepared by introducing a PHA synthetic enzyme gene derived from *Aeromonas caviae* into *Alcaligenes eutrophus* as a microorganism through appropriately adjusting the raw material and culture conditions was used. The other materials were compounded as in Tables 3 and 4 showing the materials and amounts represented by parts, and then used.

A mixture of the (3-hydroxybutyrate)-(3-hydroxyhexanoate) copolymer [PHBH], the core-shell type graft copolymer and/or acrylic modifier, the nucleating agent and the antioxidant with a mixing proportion shown in Table 3 was subjected to melt kneading using a twin screw extrusion molding machine (manufactured by Japan Steel Works, Ltd., TEX33, φ33 mm) at a cylinder preset temperature of 170° C., whereby pellets of master batches 1 to 3 were obtained.

A mixture of the (3-hydroxybutyrate)-(3-hydroxyhexanoate) copolymer [PHBH], the obtained master batch, the nucleating agent and the antioxidant with a compounding proportion shown in Table 4 was subjected to melt kneading using a twin screw extrusion molding machine (manufactured by Japan Steel Works, Ltd., TEX33, φ33 mm) at a cylinder preset temperature of 170° C., whereby a resin composition pellet was obtained.

Thus resulting pellet of the composition was extruded using a single screw extruder, LABO PRASTOMILL (manufactured by Toyo Seiki Seisaku-sho, Ltd., type 20C200) equipped with a T die having a width of 150 mm and a lip of 0.25 mm at a processing temperature of 160° C. and a rotation speed of 10 rpm, whereby a sheet was obtained. The draw down in extrusion was evaluated according to the method as described above.

Using thus resulting sheet, evaluation on tensile characteristic, and transparency was made. The results are shown in Table 4.

Comparative Example 4 and Reference Example 1

A resin composition pellet was obtained in a similar operation to Examples except that the master batch was not used, and that the compounding was carried out at the proportion shown in Table 4, and similar evaluations to those in Examples were made. The results are shown in Table 4.

TABLE 4

|  |  | Ex. 13 | Ex. 14 | Ex. 15 | Compar. Ex. 4 | Ref. Ex. 1 |
|---|---|---|---|---|---|---|
| PHBH (HH rate 12 mol %) | (part) | 90 | 95 | 90 | 100 | 100 |
| Acrylic modifier PA60 | (part) |  |  |  |  | 2 |
| Master batch 1 | (part) | 11 |  |  |  |  |
| Master batch 2 | (part) |  | 6 |  |  |  |
| Master batch 3 | (part) |  |  | 16 |  |  |
| Nucleating agent, Incroslip B | (part) | 1 | 1 | 1 | 3 | 2 |
| Antioxidant IR-1010 | (part) | 0.2 | 0.2 | 0.2 | 0.2 | 0.2 |
| Draw down characteristic | (sec) | 70 | 75 | 80 | 26 | 60 |
| Surface smoothness |  | A | A | A | A | C |
| Stress at maximum tensile point |  |  |  |  |  |  |
| MD | (MPa) | 24 | 26 | 25 | 19 | 18 |
| TD | (MPa) | 25 | 25 | 23 | 17 | 12 |
| Stress at tensile breaking point |  |  |  |  |  |  |
| MD | (MPa) | 16 | 24 | 25 | 14 | 5 |
| TD | (MPa) | 16 | 21 | 22 | 12 | 5 |
| Strain at tensile breaking point |  |  |  |  |  |  |
| MD | (%) | 206 | 290 | 326 | 22 | 28 |
| TD | (%) | 175 | 190 | 270 | 15 | 9 |
| Tensile modulus of elasticity |  |  |  |  |  |  |
| MD | (MPa) | 500 | 770 | 500 | 1200 | 520 |
| TD | (MPa) | 660 | 830 | 460 | 1100 | 660 |
| Transparency |  | A | A | A | B | B |

TABLE 3

Compounding of Master Batch

| Master batch No. |  | 1 | 2 | 3 |
|---|---|---|---|---|
| PHBH (HH rate 12 mol %) | (part) | 100 | 100 | 100 |
| Acrylic core shell type graft copolymer | (part) |  |  | 50 |
| Acrylic modifier PA60 | (part) | 10 | 20 | 10 |
| Nucleating agent Incroslip B | (part) | 1 | 1 | 1 |
| Antioxidant IR-1010 | (part) | 0.2 | 0.2 | 0.2 |

In the system including the acrylic modifier mixed therewith, it was revealed that the resin composition obtained by producing a master batch beforehand followed by compounding the master batch achieved excellent processability such as draw down characteristic and the like, and still further, resin compositions, and molded articles that have improved surface smoothness, transparency, and tensile characteristic could be obtained.

INDUSTRIAL APPLICABILITY

The resin composition of the present invention is formed into molded articles such as a variety of fiber, string, rope, woven fabric, knit fabric, nonwoven fabric, paper, film, sheet, tube, plate, bar, vessel, bag, accessory, foam and the like, which may be used alone. Alternatively, it can be used by combining with a variety of fiber, string, rope, woven fabric, knit fabric, nonwoven fabric, paper, film, sheet, tube, plate, bar, vessel, bag, accessory, foam or the like constituted with a simple substance other than this composition to improve the physical property of the simple substance. The molded article obtained in this manner can be suitably used in fields such as agriculture, fishery, forestry, horticulture, medicine, sanitary goods, food industry, clothing, nonclothing, packaging, automobile, building material, and others.

The invention claimed is:

1. A resin composition comprising (A) a biodegradable (3-hydroxyalkanoate) copolymer having a recurring unit represented by the formula (1): [—CHR—CH$_2$—CO—O—] (wherein R represents an alkyl group represented by C$_n$H$_{2n+1}$; and n is an integer of 1 to 15), and 0.1 to 20 parts by weight, based on 100 parts by weight of (A) the biodegradable (3-hydroxyalkanoate) copolymer, of (B) an acrylic modifier having an weight average molecular weight Mw of 500,000 to 10,000,000, wherein the biodegradable (3-hydroxyalkanoate) copolymer (A) has a weight average molecular weight Mw of 300,000 to 3,000,000 and is a poly[(3-hydroxybutyrate)-co-(3-hydroxyhexanoate)] comprising a (3-hydroxybutyrate) recurring unit and a (3-hydroxyhexanoate) recurring unit, and the constituent ratio of the recurring units in the poly[(3-hydroxybutyrate)-co-(3-hydroxyhexanoate)] is represented by (3-hydroxybutyrate) unit/(3-hydroxyhexanoate) unit=99/1 to 80/20 (mol/mol), and the acrylic modifier (B) is a copolymer of predominantly an acrylic ester and a methacrylic ester.

2. The resin composition according to claim 1 which is prepared by compounding using a master batch such that the acrylic modifier (B) accounts for 0.1 to 100 parts by weight based on 100 parts by weight of the biodegradable (3-hydroxyalkanoate) copolymer (A) in the resin composition, wherein the master batch comprises 5 to 400 parts by weight of the acrylic modifier (B) based on 100 parts by weight of the biodegradable (3-hydroxyalkanoate) copolymer (A).

3. The resin composition according to claim 2, wherein the master batch comprises 5 to 200 parts by weight of the acrylic modifier (B) based on 100 parts by weight of the biodegradable (3-hydroxyalkanoate) copolymer (A).

4. The resin composition according to claim 1 which further comprises a core-shell type graft copolymer (C).

5. The resin composition according to claim 1, wherein the difference in refractive indices between the acrylic modifier (B) and the (3-hydroxyalkanoate) copolymer (A) is equal to or less than 0.02.

6. The resin composition according to claim 4 wherein a core layer of the core-shell type graft copolymer (C) predominantly comprises an acrylic ester, while a shell layer thereof predominantly comprises a methacrylic acid alkyl ester.

7. The resin composition according to claim 1, wherein the acrylic modifier (B) comprises a copolymer of predominantly butyl acrylate and methyl methacrylate.

8. The resin composition according to claim 1 further comprising 0.1 to 10 parts by weight of at least one selected from a higher fatty acid amide, an urea derivative and a sorbitol-based compound as a nucleating agent based on 100 parts by weight of total amount of the biodegradable (3-hydroxyalkanoate) copolymer (A) and the acrylic modifier (B).

9. The resin composition according to claim 1 further comprising 0.1 to 100 parts by weight of a filler based on 100 parts by weight of total amount of the biodegradable (3-hydroxyalkanoate) copolymer (A) and the acrylic modifier (B).

* * * * *